United States Patent
Shigeta et al.

(10) Patent No.: US 6,414,734 B1
(45) Date of Patent: *Jul. 2, 2002

(54) LIQUID CRYSTAL DISPLAY DEVICE AND LIQUID CRYSTAL PROJECTOR

(75) Inventors: Masanobu Shigeta; Shigeo Shimizu, both of Kanagawa-ken (JP)

(73) Assignee: Victor Company of Japan, Limited, Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/315,407

(22) Filed: May 20, 1999

(30) Foreign Application Priority Data

Aug. 7, 1998 (JP) .............................. 10-224813

(51) Int. Cl.$^7$ ....................... G02F 1/1335; G02F 1/1343
(52) U.S. Cl. ............................ 349/113; 349/5; 349/139
(58) Field of Search .................... 349/5, 113–115, 349/139

(56) References Cited

U.S. PATENT DOCUMENTS 4,556,288 A  * 12/1985  Sekimura .................. 350/339
5,654,783 A  * 8/1997  Usami ........................ 349/143
6,040,881 A  * 3/2000  Koyama ........................ 349/8
6,084,650 A  * 7/2000  Sekiguchi .................... 349/106

FOREIGN PATENT DOCUMENTS

| JP | 5876813 | | 5/1983 |
| JP | 63-175827 | * | 7/1988 |
| JP | 3289625 | | 12/1991 |
| JP | 5203958 | | 8/1993 |

* cited by examiner

Primary Examiner—William L. Sikes
Assistant Examiner—Dung Nguyen
(74) Attorney, Agent, or Firm—Nath & Associates PLLC; Gary M. Nath; Marvin C. Berkowitz

(57) ABSTRACT

A liquid crystal display device using a light source having a bright line in a visible region as a light source. On the inner surface of a transparent substrate such as a glass substrate constituting a liquid crystal display device, a laminate structure constituted by a transparent electrode, an alignment layer, and one or more transparent intermediate layers having a refractive index smaller than that of the transparent electrode layer and larger than that of the liquid crystal layer or the transparent substrate is formed. The thicknesses or the like of the layers are determined such that, at the bright line wavelengths of the light source, the sum of reflectances generated on the layer interfaces of the laminate structure is set to be not more than 0.5%.

12 Claims, 9 Drawing Sheets

EXAMPLE 1

FIG. 5B

EXAMPLE 2

FIG. 5C

EXAMPLE 3

FIG.9 and is inclined at 70°

LIQUID CRYSTAL DISPLAY DEVICE AND LIQUID CRYSTAL PROJECTOR

BACKGROUND OF THE INVENTION

1. Field of the Invention

The present invention relates to a liquid crystal display device used in a direct viewing type or projection type display apparatus.

2. Description of Related Art

Figure 1A:
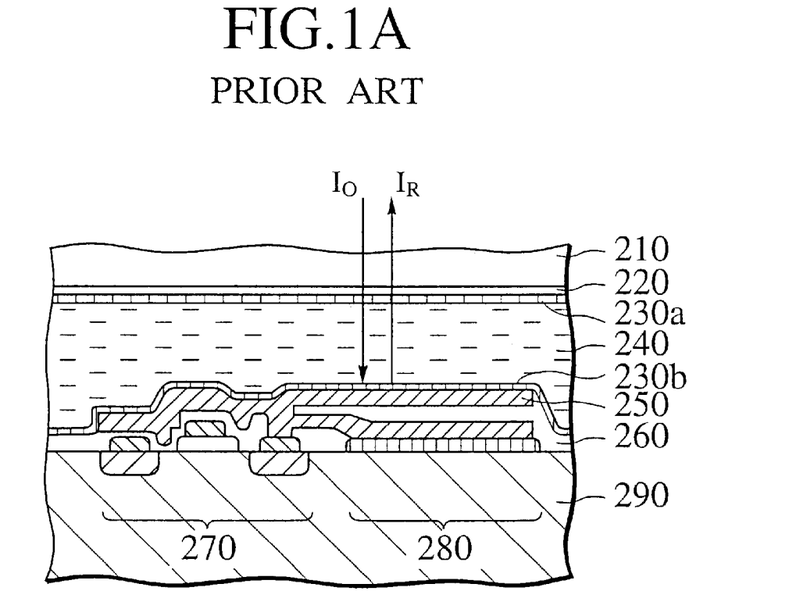
FIGS. 1A to 1B are partial sectional views for explaining interface reflection in a conventional reflection type liquid crystal display device.

FIG. 1A is a partial sectional view of a device showing an arrangement of a conventional reflection type liquid crystal display device. The liquid crystal display device has a basic structure in which two substrates each having electrodes formed on one surface are stuck to each other with a predetermined gap such that the electrodes are opposite to each other, and a liquid crystal is injected into the gap. FIG. 1A shows an arrangement of a MOS type active matrix liquid crystal display device in which transistors are arranged for pixels, respectively. A portion corresponding to one pixel is typically shown in FIG. 1A.

As shown in FIG. 1A, in many reflection type liquid crystal display devices, a transparent glass substrate 210 is used as one of two stuck substrates, and a silicon substrate 290 is used as the other substrate. A transparent electrode 220 consisting of ITO (Indium Tin Oxide) or the like is formed on the inner side of the glass substrate 210, and an alignment film 230a for regulating the array of liquid crystal molecules is formed on the surface of the transparent electrode 220.

A transistor 270 or, depending on cases, as shown in FIG. 1A, a capacitor 280 is formed on the inner surface layer of the silicon substrate 290, and an Al reflective electrode 250 functioning as an electrode and a light reflecting film is formed on these elements through an insulating interlayer 260. An alignment film 230b is also formed on the surface of the Al reflective electrode 250.

A predetermined gap is kept between the glass substrate 210 and the silicon substrate 290 by a spacer (not shown), and a liquid crystal layer 240 is formed in the gap by injection.

In such a reflection type liquid crystal display device, light $I_0$ from a light source is admitted from the glass substrate 210 side, passes through the liquid crystal layer 240, and is reflected by the Al reflective electrode 250 on the surface of the silicon substrate 290. When the light $I_0$ of incidence and reflected light $I_R$ pass through the liquid crystal layer, polarization directions are regulated depending on the alignment state of the liquid crystal molecules.

In general, in a transmission type liquid crystal display device, a region in which a transistor is formed serves as a light-shielding portion and cannot transmit light, and it is difficult to structurally obtain a high aperture ratio. However, in a reflection type liquid crystal display device, a transistor can be formed on the lower layer of the reflective electrode 250. For this reason, the reflection type liquid crystal display device is more advantageous than the transmission type liquid crystal display device with respect to an aperture ratio.

Figure 2:
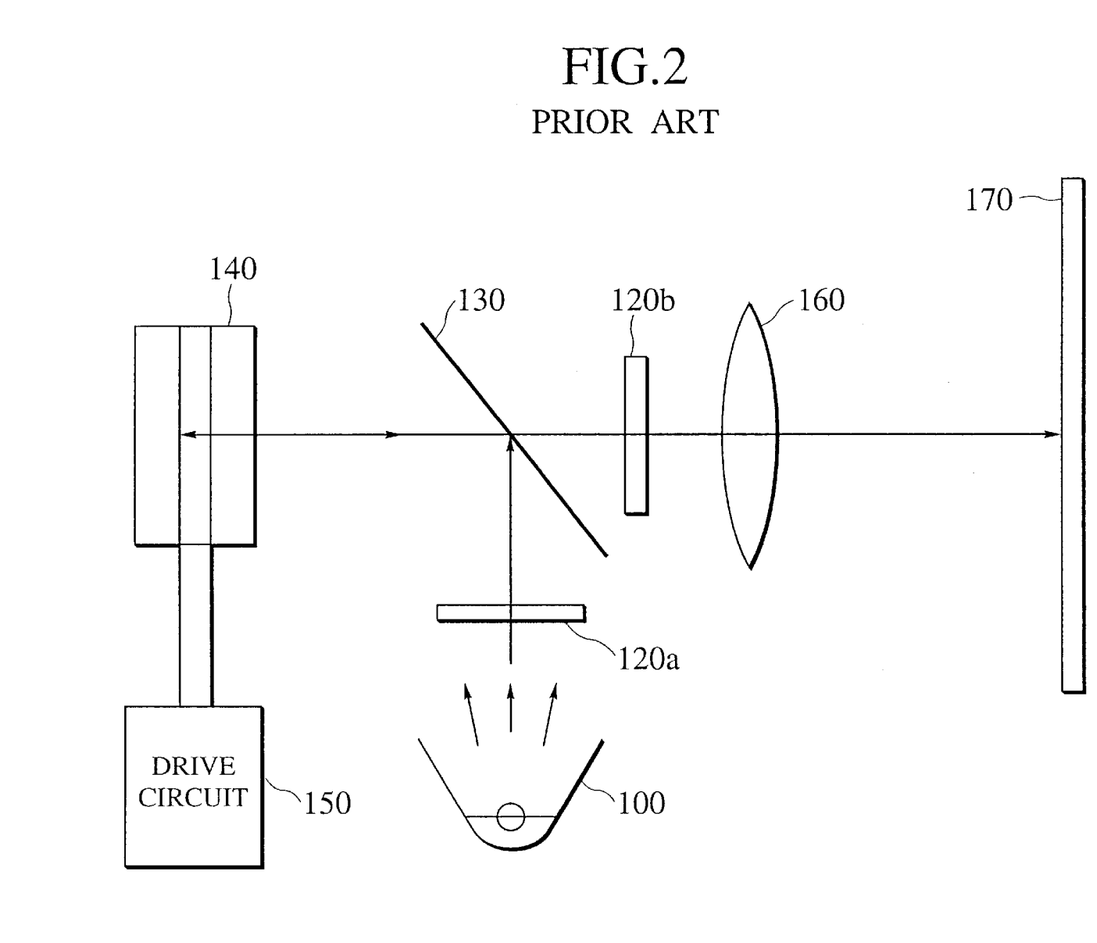
FIG. 2 is a diagram simply showing the arrangement of a conventional liquid crystal projector.

FIG. 2 is a diagram simply showing an arrangement of a conventional projection type television set, i.e., a so-called liquid crystal projector, using the reflection type liquid crystal display device described above. As shown in FIG. 2, the liquid crystal projector has, as main components, a light source 100, two polarizers 120a and 120b, a half mirror 130, a liquid crystal display device 140, a drive circuit 150 for a liquid crystal display device, an optical lens 160, and a screen 170.

For example, light emitted from the light source 100 passes through the polarizer 120a, and only a polarized light component of a predetermined direction is extracted from the light. Thereafter, the light component is changed by the half mirror 130 in a course, and is admitted on the liquid crystal display device 140. On the liquid crystal layer in the liquid crystal display device 140, a predetermined voltage is applied to each pixel through the drive circuit 150, and, accordingly, the alignment state of the liquid crystal molecules is changed depending on the predetermined voltage. The polarization direction of a light component transmitted through the liquid crystal layer is regulated by the alignment state of the liquid crystal molecules. The light component reflected by the reflective electrode surface of the liquid crystal display device passes through the half mirror 130 to reach the other polarizer 120b. Only a polarized light component of a predetermined direction is selected by the polarizer 120b, and the polarized light component is enlarged through the optical lens 160 to be projected on the screen 170.

Figure 1B:
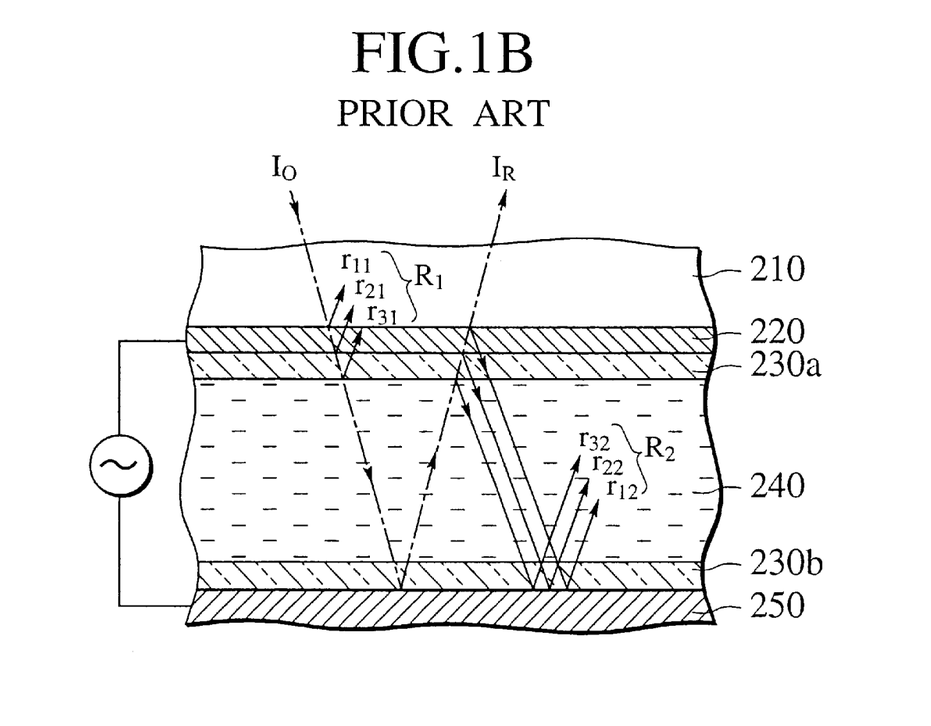

FIG. 1B is a partial sectional view of a device obtained by extracting a portion around the liquid crystal layer 240 in the liquid crystal display device shown in FIG. 1A. As shown in FIG. 1B, a part of light $I_0$ being incident on the glass substrate 210 is reflected by each layer interface in the middle of the way to the liquid crystal layer 240. In particular, since ITO or tin oxide ($SnO_2$) serving as a transparent electrode has a high refractive index of about 2, reflection easily occurs on the interface between the transparent electrode and the glass substrate or the alignment film. For example, the light $I_0$ is admitted on the liquid crystal layer 240, reflected light components r11, r21, and r31 (These light components are referred to as an interface reflected light component $R_1$ for descriptive convenience hereinafter.) are generated by the interface between the glass substrate 210 and the transparent electrode 220, the interface between the transparent electrode 220 and the alignment film 230a, and the interface between the alignment film 230a and the liquid crystal layer 240, respectively.

When the reflected light $I_R$ reflected by the reflective electrode 250 is admitted, reflected light components r32, r22, and r12 (These light components are referred to as interface reflected light $R_2$ for descriptive convenience hereinafter) are generated by the interfaces of the respective layers, respectively. The interface reflected light $R_2$ is reflected by the reflective electrode 250 again.

Since the interface reflected light $R_1$ does not pass through the liquid crystal layer 240 and is not changed in a polarization direction, in many cases, the interface reflected light $R_1$ is cut by the two polarizer 120b before reaching the screen and rarely influence the screen (see FIG. 2). However, the interface reflected light $R_2$ which passes through the liquid crystal layer 240 once and is reflected by the reflective electrode 250 to be generated is rarely cut by the polarizer 120b, and the interface reflected light $R_2$ reaches the screen together with the reflected light $I_R$.

Figure 3:
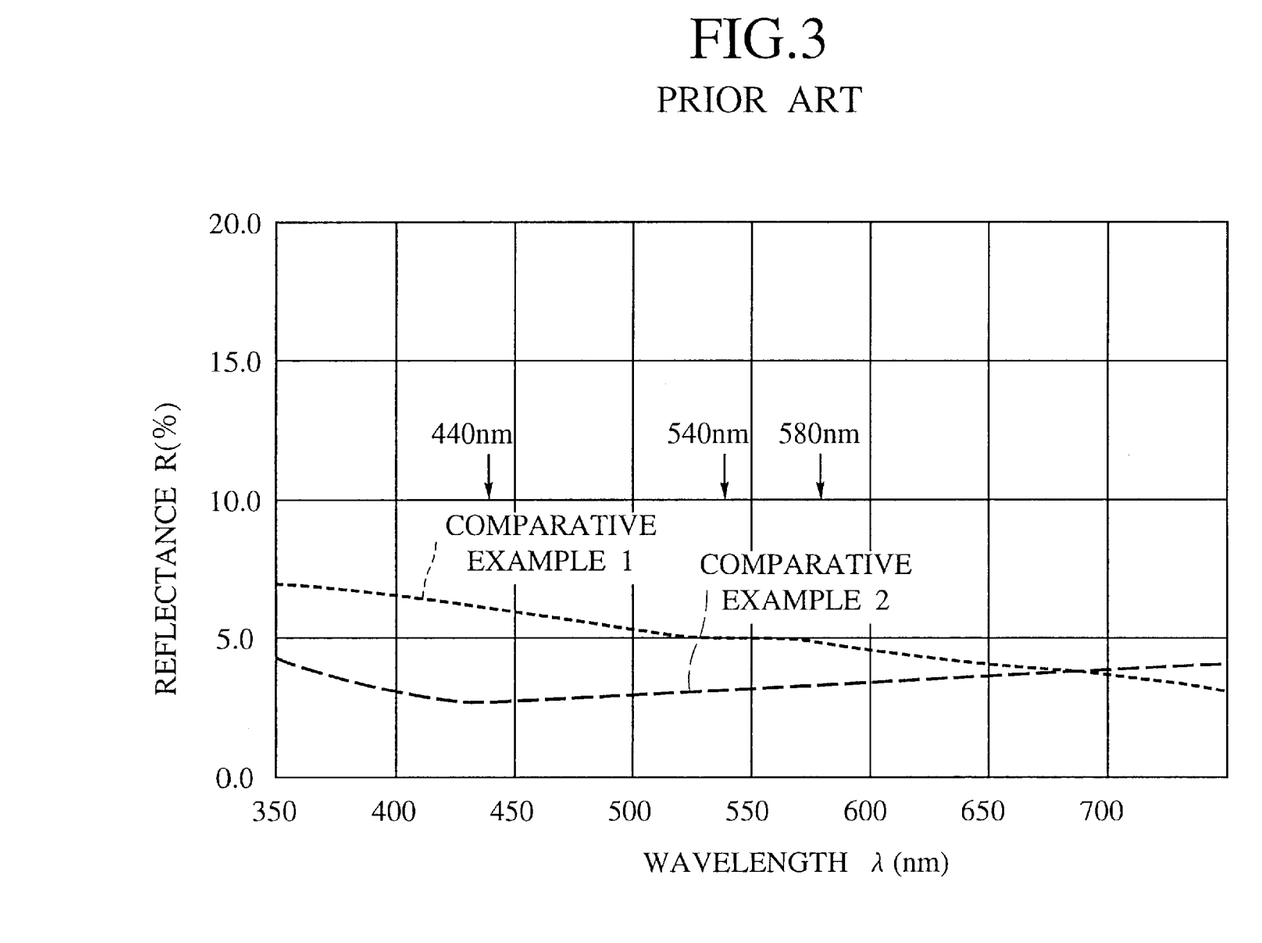
FIG. 3 is a graph showing a reflectance on the interface between a liquid crystal layer and a glass substrate in the conventional reflection type liquid crystal display device.

FIG. 3 is a graph showing a result obtained by measuring the reflectance of light corresponding to the interface reflected light $R_2$ generated in the arrangement of the conventional liquid crystal display device shown in FIG. 1B. Comparative Example 1 in FIG. 3 is a liquid crystal display device in which an ITO film having a thickness of 400 Å and formed as the transparent electrode 220 and an $SiO_2$ film having a thickness of 25 Å and formed as the alignment films 230a and 230b are used. Alignment properties are given to the alignment film such that inclined vapor deposition is performed to a substrate which is inclined at 70° with respect to a vapor deposition source. Comparative Example 2 in FIG. 3 is a liquid crystal display device in which an ITO film having a thickness of 400 Å and formed as the transparent electrode 220 and a vertical alignment polyimide film having a thickness of 700 Å and formed as the alignment films 230a and 230b are used. The vertical alignment polyimide film is applied by a printing method and thermally hardened. The surface of the polyimide film is rubbed to give alignment properties to the polyimide film.

As shown in FIG. 3, the interface reflected light $R_2$ reflected by the reflective electrode 250 and generated by the interface between the liquid crystal layer and a glass exhibits a reflectance of about 3% to 7% in a visible region in cases of Comparative Example 1 and Comparative Example 2.

In the liquid crystal projector, achievement of the brightness on the screen is an important factor as a display performance. Therefore, in order to achieve the brightness, the reflection type liquid crystal display device having a high aperture ratio and a metal halide lamp being capable of obtaining a high luminance with a small power consumption are mainly used.

Figure 4:
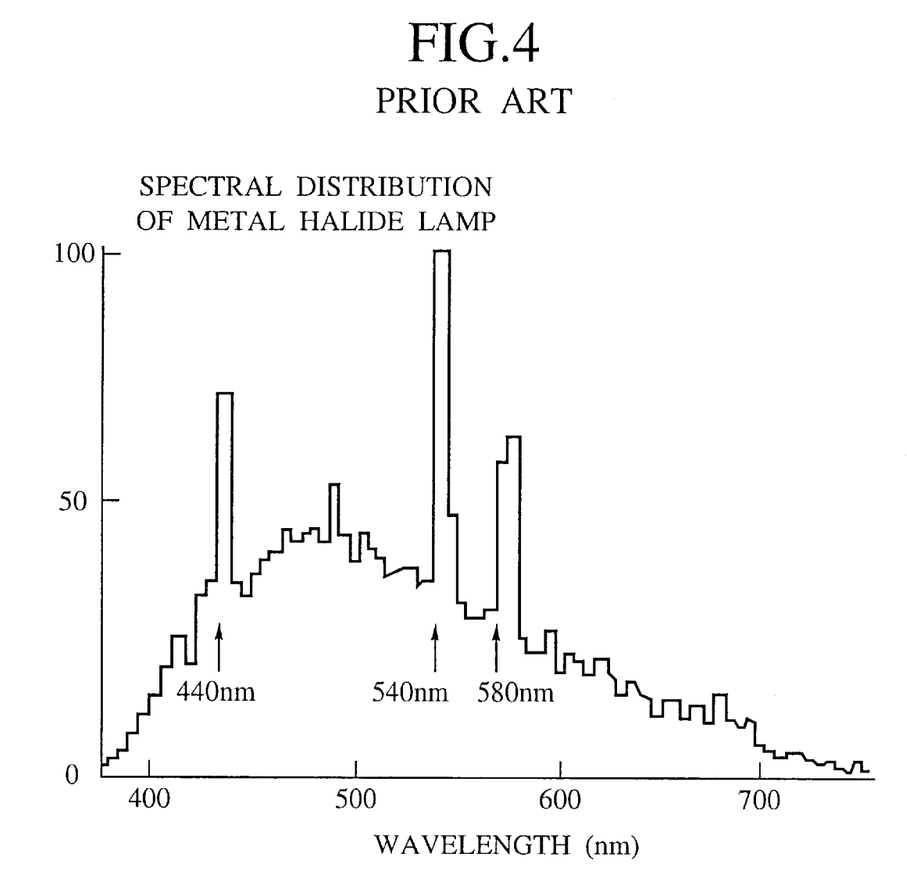
FIG. 4 is a graph showing a spectral distribution of a metal halide lamp for a liquid crystal projector.

The metal halide lamp is a discharge lamp obtained by sealing mercury and a plurality of halogenide metals in a light-emission tube. In the light-emission spectrum of the metal halide lamp, some strong bright lines inherent to the sealed materials are generated. FIG. 4 is a graph showing a spectral distribution of a metal halide lamp used in the liquid crystal projector. As shown in FIG. 4, a metal halide lamp which is most popularly used at present has strong bright lines near 440 nm, 540 nm, and 580 nm in the visible region.

As shown in FIG. 3, when the reflectance of the interface reflected light $R_2$ on the interface between the glass substrate and the liquid crystal ranges from about 3% to about 7%, the interface reflected light $R_2$ has reflection strength which cannot be neglected in a the wavelength of a bright line. For example, when a liquid crystal layer generally having a thickness of about several $\mu$m has slight unevenness, interference fringes are generated on the screen by interference between the reflected light $I_R$ and the interface reflected light $R_2$, and display quality is degraded.

In particular, the interface reflected light $R_2$ is weak in a transmission type display device because the interface reflected light $R_2$ frequently passes. However, interference becomes great in a reflection type liquid crystal display device because the interface reflected light $R_2$ strongly appears in the reflection type liquid crystal display device, and interference fringes are easily conspicuous.

As described above, interference fringes on the screen generated due to the presence of reflected light from the interface between the liquid crystal layer and the glass substrate conspicuously appear especially in a liquid crystal projector using a reflection type liquid crystal display device and a discharge lamp having a bright line spectrum, so that display quality is degraded.

SUMMARY OF THE INVENTION

It is an object of the present invention to provide a liquid crystal display device having an arrangement being capable of suppressing light reflection occurring on the interface between a liquid crystal layer and a glass substrate and a liquid crystal projector having display quality which is improved by using the liquid crystal display device.

It is another object of the present invention to provide a liquid crystal display device which is capable of using a light source having high light efficiency and has high productivity.

To achieve the object described above, from the first aspect of the present invention, a liquid crystal display device according to the present invention comprising:
  a pair of substrates, at least one of them being a transparent substrate;
  a pair of electrode layers formed on the inner surfaces of the substrates, the electrode layer formed on the inner surface of the transparent substrate being transparent;
  a pair of alignment layers formed on the inner surfaces of the substrates, the alignment layer formed on the inner surface of the transparent substrate being transparent; and
  a liquid crystal layer intervening between the pair of substrates;
  wherein a laminate structure constituted by the transparent electrode layer, the alignment layer, and one or more transparent intermediate layers having a refractive index smaller than that of the transparent electrode layer and larger than that of the liquid crystal layer or the transparent substrate is formed on the inner surface of the transparent substrate.

According to the liquid crystal display device, the laminate structure using the electrode layer and the alignment layer and using a transparent material having an intermediate refractive index between the refractive indexes of these layers as an intermediate layer is formed, so that the thicknesses of the respective layers can be adjusted, reflectances of the interfaces of the layers can be relatively easily reduced, and occurrence of defective display caused by reflection on the interfaces can be prevented.

Preferably, a light source having a bright line in a visible region is used as a light source. The laminate structure is designed to determine, in the bright line wavelength of the light source, the refractive indexes and thicknesses of the layers constituting the laminate structure such that the sum of reflectances, generated on the layer interfaces of the laminate structure, of light propagating from the liquid crystal layer to the transparent substrate is set to be not more than 0.5%.

According to the liquid crystal display device, even if a light source having a bright line which is conspicuously influenced by reflection on the interfaces of the laminate structure formed on the transparent substrate is used, the sum of reflectances generated on the layer interfaces of the laminate structure is set to be not more than 0.5%. For this reason, even if some unevenness of the thickness of the liquid crystal cell is present, occurrence of defective display caused by reflection on the interfaces can be prevented.

Preferably, the other of the pair of substrates comprises, as an electrode layer formed on the inner surface, a reflective electrode layer which reflects light in a visible region.

The laminate structure formed on the inner surface of the transparent substrate is designed such that a first intermediate layer, a transparent electrode layer, and an alignment layer are laminated in order from a transparent substrate side.

From the second aspect of the present invention, there is provided a projection type display apparatus having the liquid crystal display device.

According to the projection type display apparatus, since the liquid crystal display device is used, generation of reflected light which generates interference fringes on a screen to emitted light from the liquid crystal display device used for original display is prevented, and preferable display quality can be maintained.

Since the liquid crystal display device is used, even if a metal halide lamp which has high light efficiency but has a bright line in a visible region is used as a light source, preferable display quality can be maintained.

From the third aspect of the present invention, there is provided a liquid crystal display device using a light source using a bright line in a visible region, comprising:

a pair of opposite substrates;

a liquid crystal sealed between the substrates;

a first transparent material film formed on one of the substrates on which light from the light source is admitted, and being in contact with the liquid crystal; and a second transparent material film with which the first transparent material film is in contact;

wherein a refractive index of the first transparent material film is set to be an intermediate value between a refractive index of the second transparent material film and a refractive index of the liquid crystal.

Preferably, a reflectance of an interface between the first transparent material film and the liquid crystal is not more than 0.5%.

Preferably, when a wavelength of a bright line generated by the light source or an intermediate value of wavelengths of a plurality of bright lines generated by the light source is represented by $\lambda$, the thickness of the first transparent material film is set to be $\lambda/4$ as an optical film thickness and the thickness of the second transparent material film is set to be $\lambda/2$ as an optical film thickness.

DESCRIPTION OF THE PREFERRED EMBODIMENTS

The first embodiment of the present invention will be described below.

In a liquid crystal display device, in many cases, a transparent electrode and an alignment film formed on a glass substrate are necessary components. In a conventional art, the conditions such as film thicknesses of these components, e.g., the thickness of the transparent electrode is mainly determined in consideration of a resistance and a transmittance. The material, film thickness, and manufacturing method of the alignment film are selected such that the alignment properties of the alignment film are maximally preferable.

In contrast to this, in the liquid crystal display device according to the embodiment of the present invention, the conditions such as film thicknesses of a transparent electrode and an alignment film formed on a glass substrate are also determined in consideration of a light reflection prevention effect. The liquid crystal display device has the following great characteristics. That is, on the consumption that the liquid crystal display device comprises necessary components such as a transparent electrode and an alignment film, one or more "intermediate layers" consisting of a transparent material are added as components to form a new laminate structure as a whole, the refractive indexes and film thicknesses of the respective layers are determined within the range in which the refractive indexes and the film thicknesses can be adjusted, and generation of light reflection of the laminate structure serving as an interface between the liquid crystal layer and the glass substrate is suppressed.

For reflection characteristics on the interface, the thickness and refractive indexes of the layers constituting the laminate structure are important factors. For example, a generally used glass substrate has a refractive index of about 1.48 to 1.55, and the refractive index of ITO or $SnO_2$ used as the transparent electrode is about 2. In order to obtain a sufficiently low resistance, the transparent electrode requires a thickness of at least several hundred Å or more. Since it is important that an alignment film to be used requires sufficient alignment properties, a material to be used and a film thickness are naturally limited. For example, when an $SiO_2$ film formed by using inclined vapor deposition used in a Twisted Nematic (TN) liquid crystal display device is used as an alignment film, a film thickness of at least 500 Å or more is required. When a polyimide film to which alignment properties are given by rubbing the surface of the film is used as an alignment film, the film thickness of the polyimide film is generally set to be 700 to 800 Å. The refractive index of the $SiO_2$ film is about 1.46, and the refractive index of the polyimide film is about 1.6 to 1.7. The refractive index of a generally used nematic liquid crystal is about 1.53. These refractive indexes slightly change depending on manufacturing methods or the wavelength of light.

By only the combination of the necessary component materials, interface reflected light generated on the interface between the liquid crystal layer and the glass substrate cannot be easily reduced. In this embodiment, as described above, in order to more easily realize a reflection prevention effect, one or more layers called "intermediate layers" are arranged between an alignment film and a transparent electrode or between the transparent electrode and the glass substrate.

It is preferable that the intermediate layer has a high transmittance in at least a visible region and is relatively easily manufactured. For example, as such a film, an $Al_2O_3$ film, a $ZrO_2$ film, an $SiO_2$ film, an SiNx film, or $TiO_2$ film is considered. Preferably, a material, such as $Al_2O_3$ having a refractive index of 1.6 to 1.7, having an intermediate refractive index smaller than that of the transparent electrode and larger than that of the glass substrate or the liquid crystal layer is used as an intermediate layer.

As described above, an intermediate layer whose film thickness and refractive index can be selected within a wider range is added to the transparent electrode and the alignment film which are necessary components in the conventional liquid crystal display device, and a laminate structure is formed on a glass substrate, so that reflection on the interface between the liquid crystal layer and the glass substrate can be effectively reduced.

Concrete Examples will be described below.

(Example 1)

Figure 5A:
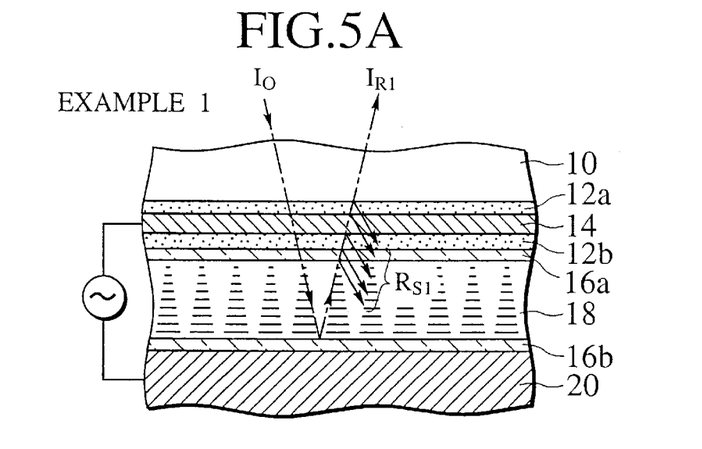
FIGS. 5A to 5C are partial sectional views showing the structures of liquid crystal display devices of Example 1 to Example 3 in the first embodiment of the present invention.

FIG. 5A is a partial sectional view of a reflection type liquid crystal display device manufactured in Example 1. Example 1 is a vertical alignment type liquid crystal display device. The basic structure of the liquid crystal display device is the same as that shown in FIG. 1A. Transistors or the like required for respective pixels are formed on a silicon substrate serving as one substrate as in the conventional art, and an Al film 20 serving as an electrode and a reflective film is formed on the transistors. An alignment film 16b constituted by an $SiO_2$ film is formed on the surface of the Al film 20.

On an opposite glass substrate 10, $Al_2O_3$ films 12a and 12b serving as intermediate layers are formed between the glass substrate 10 and an ITO film 14 and between the ITO film 14 and an alignment film 16a. More specifically, on the glass substrate 10, the intermediate layer ($Al_2O_3$ film 12a), the ITO film 14, the intermediate layer ($Al_2O3$ film 12b), and the alignment film ($SiO_2$ 16a) are sequentially arranged from the substrate side.

The film thicknesses of the layers formed on the glass substrate 10 were determined in consideration of the actual refractive indexes of the materials and the following conditions. That is, interface reflection RS1 generated on an interface where light is reflected by the surface of the Al film 20, passes through a liquid crystal layer 18, and is admitted on the glass substrate 10 at 440 nm, 540 nm, and 580 nm which were bright line wavelengths of a metal halide lamp used as a light source had a value sufficiently smaller than that of conventional interface reflection. More specifically, when λ is set to be an intermediate wavelength, i.e., 540 nm, of three bright line wavelengths of the metal halide lamp, the optical thicknesses of the layers of the laminate structure on the glass substrate 10 were given as follows. That is, the optical thicknesses of the $Al_2O_3$ film 12a, the ITO film 14, the $Al_2O_3$ film 12b, and the alignment film 16a were set to be λ/4, λ/2, λ/4, and λ/4, respectively.

A manufacturing method of the respective films will be briefly described below.

Both the $Al_2O_3$ films 12a and 12b used as intermediate layers were formed by using a vacuum vapor deposition method by ion-beam assist. The degree of vacuum during film formation, i.e., an oxygen partial pressure was set to be $7\times10^{-5}$ Torr, and a substrate temperature was set to be 250° C. A film growth rate was set to be 5 Å/sec. Power of the ion-beam assist was set to be 350 V and 22 mA.

The ITO film 14 used as a transparent electrode was also formed by using a vacuum vapor deposition method by ion-beam assist. The degree of vacuum during film formation, i.e., an oxygen partial pressure was set to be $4\times10^{-4}$ Torr, and a substrate temperature was set to be 250° C. A film growth rate was set to be 1 Å/sec. Power of the ion-beam assist was set to be 350 V and 22 mA.

The $SiO_2$ alignment films 16a and 16b were formed by using a vacuum vapor deposition method by ion-beam assist. The degree of vacuum during film formation, i.e., an oxygen partial pressure was set to be $3\times10^{-5}$ Torr, and a substrate temperature was set to be the room temperature. In order to give alignment properties to the films, the substrate is inclined with respect to the vapor deposition source, and inclined vapor deposition was performed. A film growth rate was set to be 8 Å/sec. Power of the ion-beam assist was set to be 800 V and 80 mA.

Manufacturing of transistors on the silicon substrate, a reflective electrode (Al film 20), and the like was performed by using a conventional method according to a method of manufacturing a general transistor. In this manner, after structures required for the silicon substrate and the glass substrate were formed on the inner surfaces of the silicon substrate and the glass substrate, respectively, the two substrates were stuck to each other through a spacer to have a gap of about 3 μm. Thereafter, a nematic liquid crystal (EN-37 available from Chisso Corp.) having negative dielectric anisotropy was injected into the gap to seal the injection port.

Figure 6:
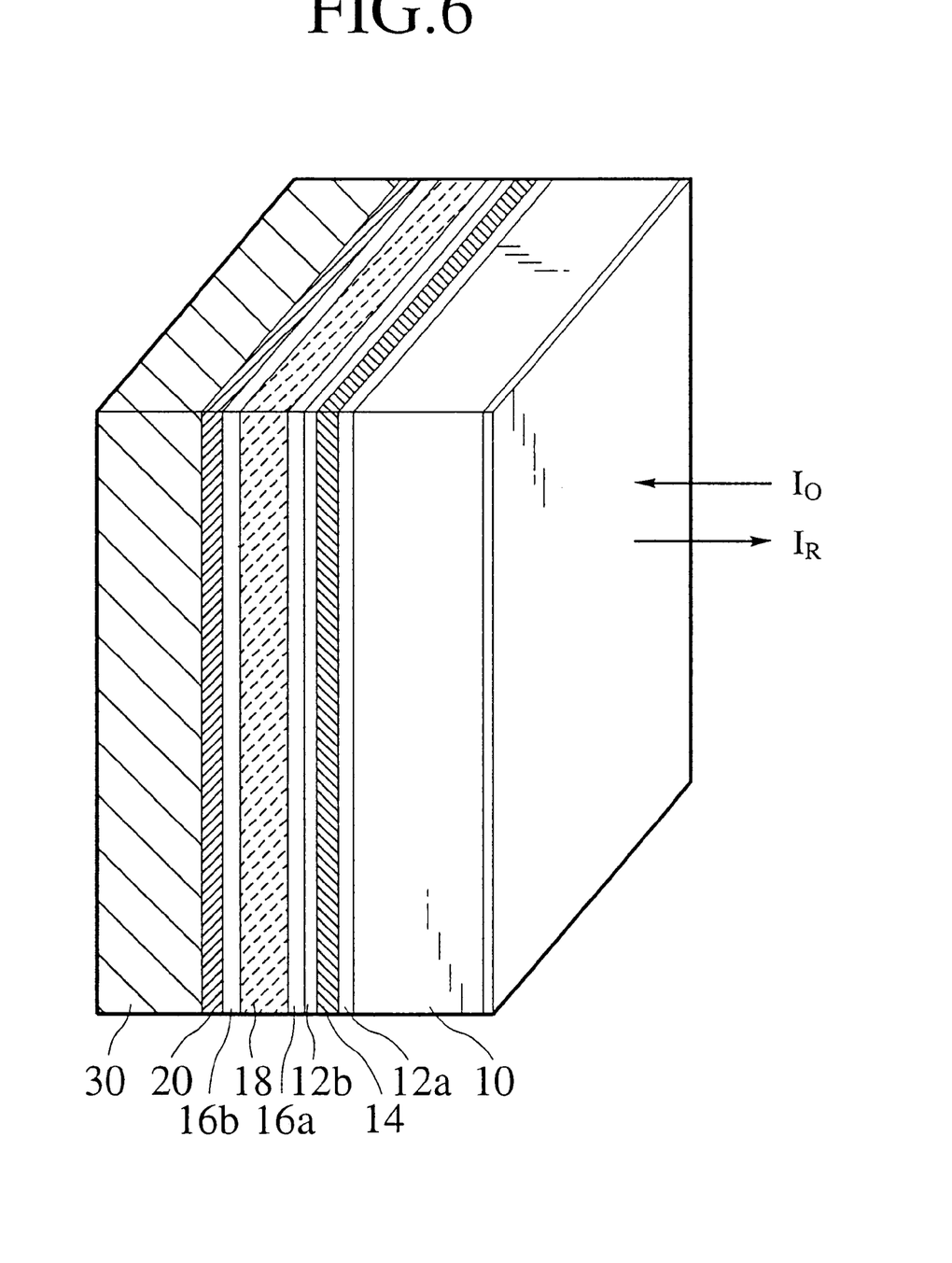
FIG. 6 is a perspective view showing the structure of a liquid crystal display device of Example 1 in the first embodiment of the present invention.

FIG. 6 is a perspective view showing the arrangement of the liquid crystal display device in Example 1. The liquid crystal display device has an arrangement in which, from the right side in FIG. 6, the glass substrate 10, the $Al_2O_3$ film 12a, the ITO film 14, the $Al_2O_3$ film 12b, the $SiO_2$ alignment film 16a, the liquid crystal layer 18, the alignment film 16b, the Al film 20, and a silicon substrate 30 are sequentially arrayed. A reflection prevention film may not be formed on the outer surface of the glass substrate 10.

Figure 7:
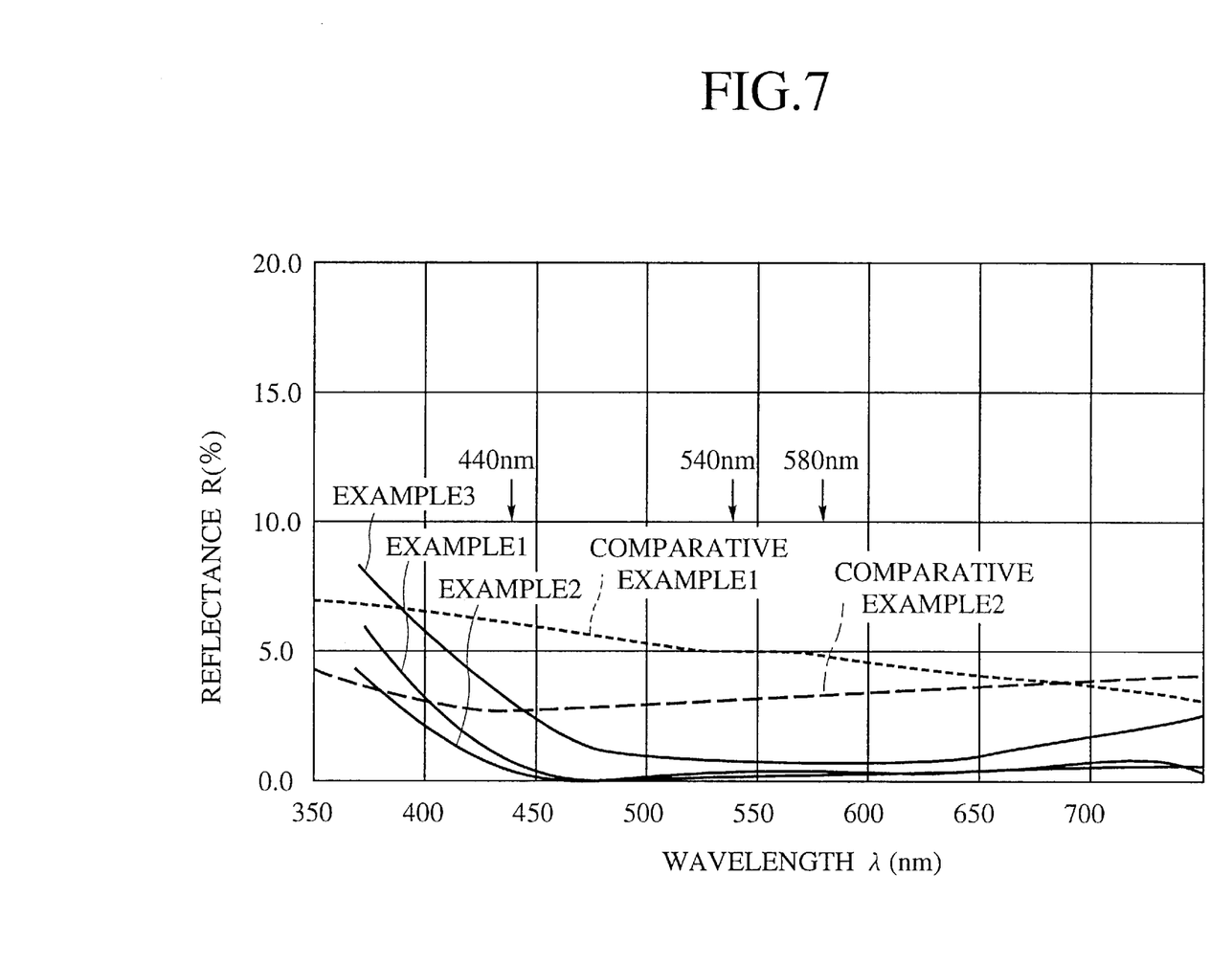
FIG. 7 is a graph showing reflectances on the interfaces between the glass substrates and the liquid crystal layers in the liquid crystal display devices of Example 1 to Example 3 in the first embodiment of the present invention.

FIG. 7 shows measured reflectances (Rs1, Rs2, and Rs3) of interface reflected light in the liquid crystal display devices of Examples. In FIG. 7, as references, measured values (corresponding to comparative examples in FIG. 3) in a conventional liquid crystal display device are shown. The interface reflected light Rs1 (see FIG. 5A) in the liquid crystal display device of Example 1 is indicated by a solid line "Sample 1" in FIG. 7. At 440 nm, 540 nm, and 580 nm which were bright line wavelengths of the metal halide lamp, the reflectances could be suppressed to 0.5% or less.

(Example 2)

Figure 5B:
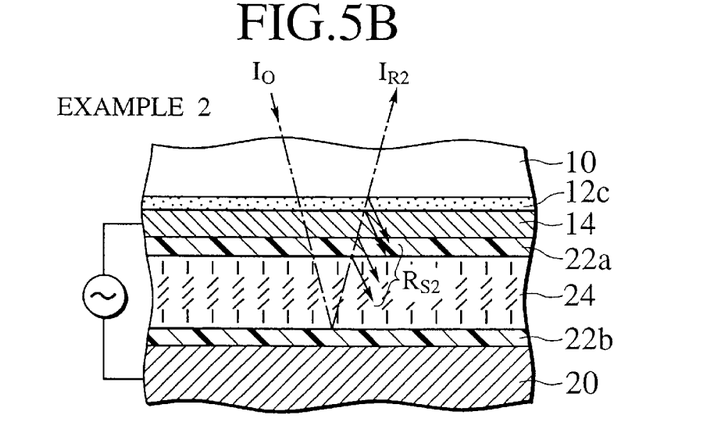

FIG. 5B is a partial sectional view of a reflection type liquid crystal display device manufactured in Example 2. As in Example 1, the basic structure of the liquid crystal display device of Example 2 is the same as that the conventional structure shown in FIG. 1A. Example 2 is a vertical alignment type liquid crystal display device.

As shown in FIG. 5B, as in a conventional art, transistors or the like required for respective pixels are formed on a silicon substrate serving as one substrate, and an Al film 20 serving as an electrode and a reflective film is formed on the transistors. A polyimide alignment film 22b is formed on the surface of the Al film 20.

On an opposite glass substrate 10, an $Al_2O_3$ film 12c serving as an intermediate layer is added between the glass substrate 10 and an ITO film 14. More specifically, on the glass substrate 10, the intermediate layer ($Al_2O_3$ film 12c), the ITO film 14, and an alignment layer (polyimide alignment film 22a) are sequentially formed from the substrate side.

The optical film thicknesses of the layers formed on the glass substrate 10 were determined as follows. That is, when λ denotes an intermediate wavelength, i.e., 540 nm, of three bright line wavelengths of the metal halide lamp, the optical thicknesses of the $Al_2O_3$ film 12c, the ITO film 14, and the polyimide alignment film 22a were set to be λ/4, λ/2, and λ/4, respectively.

As manufacturing conditions of the $Al_2O_3$ film 12c, the ITO film 14, the same manufacturing conditions as in Example 1 were used. The polyimide films 22a and 22b were formed by the following method. That is, films were formed by using a screen printing method, the films were thermally hardened at 180° C., and the film surfaces were rubbed to give alignment properties to the films.

Manufacturing of transistors on the silicon substrate, a reflective electrode, and the like was performed by using the same method as that in a conventional art. After required layers were formed on the silicon substrate and the glass substrate, respectively, the two substrates were stuck to each other through a spacer to have a gap of about 3 $\mu$m. A liquid crystal EN-37 was injected into the gap to seal the injection port and formed a liquid crystal layer 24.

A result obtained by measuring the reflectance of the interface reflection RS2 of the liquid crystal display device of Example 2 is indicated by a solid line "Sample 2" in FIG. 7. The reflectance could be suppressed to 0.5% or less at 440 nm, 540 nm, and 580 nm which were bright line wavelengths of the metal halide lamp.

(Example 3)

Figure 5C:
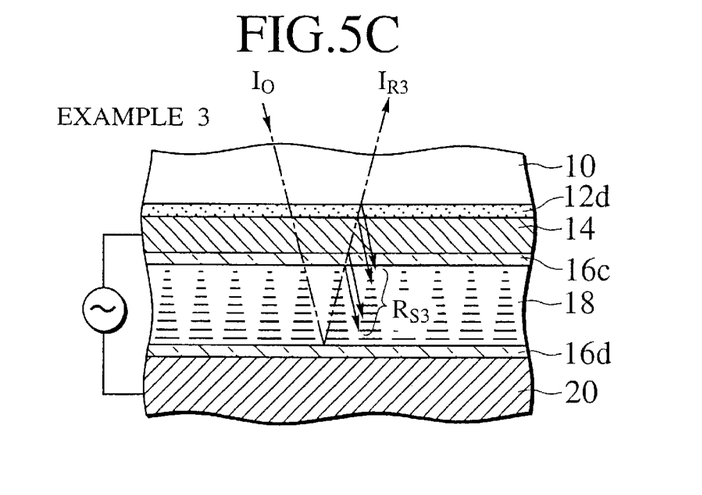

FIG. 5C is a partial sectional view of a reflection type liquid crystal display device manufactured in Example 3. As in Example 1, Example 3 is a TN liquid crystal display device. The basic structure of the liquid crystal display device is the same as that the conventional structure shown in FIG. 1A.

As in a conventional art, transistors or the like required for respective pixels are formed on a silicon substrate serving as one substrate, and an Al film 20 serving as an electrode and a reflective film is formed on the transistors. An $SiO_2$ alignment film 16d is formed on the surface of the Al film 20.

On an opposite glass substrate 10, an $Al_2O_3$ film 12d serving as an intermediate layer is added between the glass substrate 10 and an ITO film 14. More specifically, on the glass substrate 10, the intermediate layer ($Al_2O_3$ film 12d), the ITO film 14, and an alignment layer ($SiO_2$ alignment film 16c) are sequentially formed from the substrate side. Although two intermediate layers were used in Example 1, only one intermediate layer was used in Example 3.

The thicknesses of the layers formed on the glass substrate 10 were determined in consideration of the actual refractive indexes of the materials and the following conditions. That is, at 440 nm, 540 nm, and 580 nm which were bright line wavelengths of a metal halide lamp used as a light source, light reflected by the surface of the Al film 20 and interface reflected light RS3 generated on the interface between a liquid crystal layer 18 and the glass substrate 10 had values smaller than those in a conventional art. More specifically, when $\lambda$ denotes an intermediate wavelength, i.e., 540 nm, of three bright line wavelengths of the metal halide lamp, the optical thicknesses of the layers were given as follows. That is, the optical thicknesses of the $Al_2O_3$ film 12d, the ITO film 14, and the $SiO_2$ alignment film 16c were set to be $\lambda/4$, $\lambda/2$, and $\lambda/2$, respectively.

As manufacturing conditions of the $Al_2O_3$ film 12d, the ITO film 14, and the $SiO_2$ alignment film 16c, the same manufacturing conditions as in Example 1 were used.

Manufacturing of transistors on the silicon substrate, a reflective electrode, and the like was performed by using the same method as that in a conventional art. After required layers were formed on the silicon substrate and the glass substrate, respectively, the two substrates were stuck to each other through a spacer to have a gap of about 3 $\mu$m. A liquid crystal EN-37 was injected into the gap to seal the injection port.

A result obtained by measuring the reflectance of the interface reflected light RS3 of the liquid crystal display device manufactured in Example 3 is indicated by a solid line "Sample 3" in FIG. 7. The reflectance is lower than the reflectances in Comparative Examples 1 and 2. However, the reflectance is slightly higher than the reflectances in Example 1 (Sample 1) and Example 2 (Sample 2). A reflectance of 0.7% to 2.5% was achieved in a visible region.

(Display Quality Evaluation)

A liquid crystal projector having the arrangement shown in FIG. 2 was manufactured by using the liquid crystal display devices of Examples 1 to 3 and a 180 W metal halide lamp serving as a light source, and a display was made on an actual screen to perform visual evaluation of the presence/absence of generation of interference fringes on the screen. In addition, evaluation was also made when a xenon lamp having no bright line in a visible region was used as a light source. The result is shown in Table 1. Evaluation results obtained when conventional liquid crystal devices (Comparative Example 1 and Comparative Example 2 in FIG. 3) are used are also shown.

As evaluation targets, the liquid crystal devices in which distributions of liquid crystal cell thicknesses were about 20% were selected. As standards of evaluation, a case wherein the presence of interference fringes on a screen can be visually confirmed by general attentiveness is represented by X, a case wherein the presence of interference fringes on a screen can be visually confirmed by only careful observation is represented by $\Delta$, and a case wherein the presence of interference fringes on a screen cannot be visually confirmed by careful observation is represented by $\bigcirc$.

TABLE 1

|  | Display Quality | |
| --- | --- | --- |
|  | Use of Xenon Lamp | Use of Metal Halide Lamp |
| Example 1 | $\bigcirc$ | $\bigcirc$ |
| Example 2 | $\bigcirc$ | $\bigcirc$ |
| Example 3 | $\bigcirc$ | $\Delta$ |
| Comparative Example 1 | $\bigcirc$ | X |
| Comparative Example 2 | $\bigcirc$ | X |

As shown in Table 1, when a xenon lamp having no bright line was used as a light source, in not only the liquid crystal display devices of Examples 1 to 3, but also in a case wherein the liquid crystal display devices of Comparative Examples 1 and 2, no interference fringes were not observed, and all the liquid crystal display devices could obtain preferable display quality. However, when a metal halide lamp having a bright line in a visible region was used as a light source, apparent difference between the display quality in Comparative Examples 1 and 2 and the display quality in Examples 1 to 3 was detected. When Comparative Examples 1 and 2 were used, interference fringes were confirmed on the screen by general attentiveness. When Example 3 having an interface reflectance slightly higher than those of Examples 1 and 2 was used, the presence of interference fringes was confirmed on the screen by only careful observation. When the liquid crystal display devices having the arrangements of Example 1 and Example 2 in which the reflectances of interface reflected light were 0.5% or less at any bright line wavelengths of the metal halide lamp were used, interference fringes on the screens could not be visually confirmed, and preferable display quality could be achieved.

As a method of preventing generation of interference fringes on a screen, a method of performing management adjustment of production processes to make the thickness of a liquid crystal cell uniform or a method of cutting a bright line wavelength is considered. However, the management of the liquid crystal cell thickness sacrifices the productivity because loads on the processes are extremely heavy. Because a xenon lamp or the like having no bright line has optical efficiency lower than that of a metal halide lamp and has light source life shorter than that of a metal halide lamp, this selection is not always preferable. In addition, when the bright line wavelength of the metal halide lamp is cut by a color filter or the like, screen brightness is considerably sacrificed.

In contrast to this, in a liquid crystal display device according to this embodiment in which a laminate structure being capable of reducing interface reflection between the liquid crystal layer and the glass substrate is formed on the glass substrate being in contact with the liquid crystal layer by using the transparent electrode, the alignment film, and the intermediate layer, when a light source having a strong bright line and high light efficiency is used, high display quality can be maintained even if the liquid crystal cell has a slight uneven thickness. The productivity and a screen luminance are not sacrificed.

As structures of concrete liquid crystal display devices based on this embodiment, Examples 1 to 3 are exemplified. However, the liquid crystal display device according to the present invention is not limited to Examples described above, and various materials and film thicknesses may be selected. As has been described above, for example, as the intermediate layer, in addition to an $Al_2O_3$ film, a metal oxide such as a $ZrO_2$ film, an $SiO_2$ film, and a $TiO_2$ film, a metal nitride such as an $SiN_x$, and a fluoride such as an $MgF_2$ may be considered. When a plurality of intermediate layers are used, different materials for respective layers may be used. Depending on the optical properties of the materials of a glass substrate, a transparent electrode, an alignment film, a liquid crystal layer, and the like, the types and thicknesses of the intermediate layers to be used may be selected. The number of intermediate layers is not limited to one or two, and a larger number of layers may be stacked.

As is considered from the results of the graph shown in FIG. 7 and Table 1, when a laminate structure for suppressing an interface reflectance generated between the liquid crystal layer and the glass substrate to 0.5% or less is formed on the glass substrate, extremely preferable display quality can be obtained in a liquid crystal projector.

A light source combined to a liquid crystal projector using the liquid crystal display device of this embodiment is not limited to a metal halide lamp. When a light source having a bright line in a visible region is used, the same effect as described above can be achieved.

In Examples described above, only the structure of a reflection type liquid crystal display device is exemplified. However, it is apparent that the design and technical scope of the liquid crystal display device according to this embodiment can also be applied to the arrangement of a transmission type liquid-crystal display device.

The liquid crystal display device of this embodiment can also be used in not only a liquid crystal projector but also various direct viewing display apparatuses.

The details of a liquid crystal display device according to the second embodiment of the present invention will be described below with reference to the accompanying drawings.

This embodiment is obtained by applying the present invention to a liquid crystal display device of a reflection type active matrix drive method used in a liquid crystal projector and having a pixel electrode functioning as a reflective plate (reflective film). In this embodiment, although the pixel electrode has a reflecting function, the pixel electrode may consist of a transparent material, and a reflective plate (reflective film) may be independently arranged.

Figure 8:
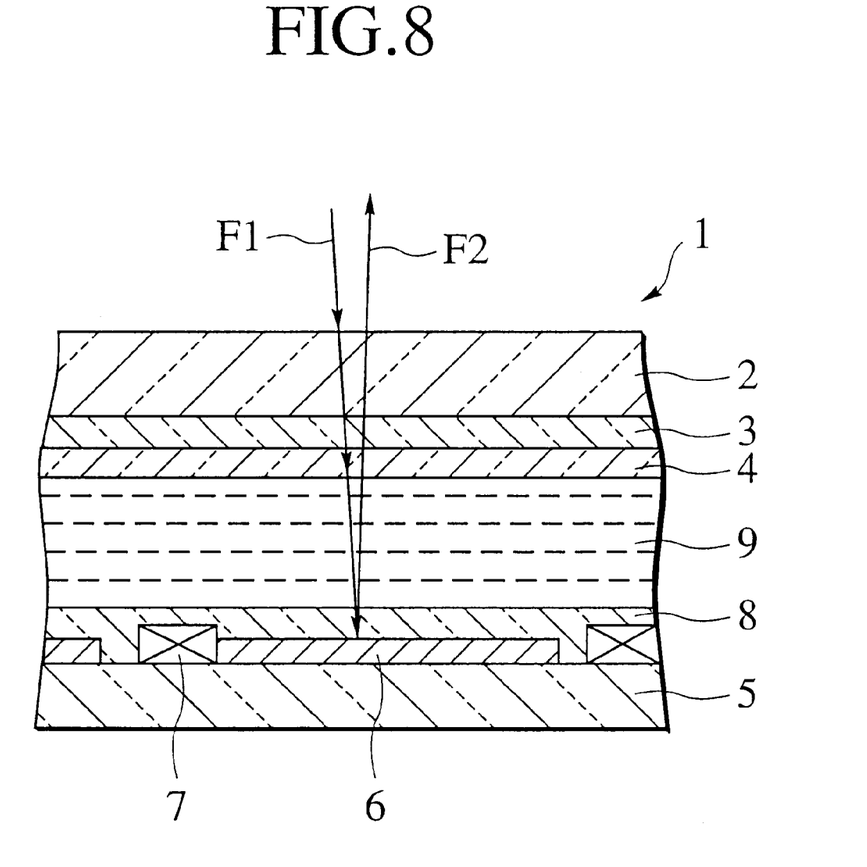
FIG. 8 is a sectional view for explaining a liquid crystal display device according to the second embodiment of the present invention.

FIG. 8 is a sectional view for explaining a main part of the arrangement of the liquid crystal display device (liquid crystal cell) according to this embodiment. As shown in FIG. 8, in a liquid crystal display device 1 according to this embodiment, a transparent electrode (common electrode) 3 serving as a second transparent material film consisting of, e.g., ITO is formed on the entire display region on the rear surface of a front glass substrate 2 located on the front side, a front alignment film 4 serving as a first transparent film is formed on the rear surface of the transparent electrode. Pixel electrodes 6 consisting of a metal having light reflection properties are arranged in the form of a matrix on the front surface of a rear glass substrate 5 opposing the front glass substrate 2. Thin film transistors (to be referred to as TFTs) 7 serving as switching transistors are connected to the pixel electrodes 6, respectively. FIG. 8 shows a structure in which the pixel electrodes 6 and the TFTs 7 are arrayed on the front surface of the rear glass substrate 5. However, in order to prevent the TFTs 7 from being erroneously operated by light from the light source, the TFTs 7 may be covered with the pixel electrodes 6 having light-shielding properties.

A rear alignment film 8 is formed on the front surface of the rear glass substrate 5 including the pixel electrodes 6 and the TFTs 7 to cover the entire display region. The front alignment film 4 on the front glass substrate 2 and the rear alignment film 8 on the rear glass substrate 5 are arranged opposite to each other, and both the glass substrates 2 and 5 are stuck to each other with a sealing material (not shown) formed to surround the display region. A spacer (gap material) for defining a predetermined cell gap is interposed between the front alignment film 4 and the rear alignment film 8. A nematic liquid crystal 9 having negative dielectric anisotropy is sealed into the gap formed by the front and alignment films 4 and 8. Since the liquid crystal display device 1 according to this embodiment performs a reflection type display, as shown in FIG. 8, read light F1 being incident from the front glass substrate 2 side is polarized depending on the alignment state of the liquid crystal 9, is reflected by the pixel electrodes 6 through the front glass substrate 2, the transparent electrode 3, the front alignment film 4, the liquid crystal 9, and the rear alignment film 8, passes through the liquid crystal 9, the front alignment film 4, the transparent electrode 3, and the front glass substrate 2 again, and is emitted as reflection display light F2.

In the liquid crystal display device 1, the present inventors found that interference fringes generated by interface reflection between the liquid crystal 9 and the front alignment film 4 could be suppressed by suppressing the interface reflectance between the liquid crystal 9 and the front alignment film 4 to 0.5% or less. Although visibility of interference fringes changed depending on the brightness and color of a display screen without changing a reflectance, it was actually confirmed that the interface reflection was required to be 0.5% or less. In particular, in this embodiment, $Al_2O_3$ having a refractive index ranges from the refractive index of the transparent electrode 3 consisting of ITO to the refractive index of the liquid crystal 9 was used as a material of the alignment film. An $Al_2O_3$ film was interposed between the front glass substrate 2 and the transparent electrode 3.

As the liquid crystal display device, Examples 4 to 7 using $Al_2O_3$ having the above arrangement as alignment films, and Comparative Example 3 and Comparative Example 4 which did not use $Al_2O_3$ as alignment films were prepared to evaluate visibility of interference fringes. The method of evaluating the visibility of the interference fringes, was performed such that the reflection type liquid crystal display device 1 was incorporated in a conventional projection type liquid crystal projector. The arrangement of the projection type liquid crystal projector shown in FIG. 2 was already described above. Here, the liquid crystal display device 1 is used as a liquid crystal display device, instead of the liquid crystal device 140.

(Example 4)

An $Al_2O_3$ film having an optical film thickness of $\lambda/4$ and a transparent electrode 3 consisting of ITO having an optical film thickness of $\lambda/2$ are formed on the rear surface of a front glass substrate 2 by a vapor deposition method. An $Al_2O_3$ film having an optical film thickness of $\lambda/4$ is formed as a front alignment film 4 to be subjected to an alignment process. In this case, $\lambda$ denotes the wavelength of a bright line which causes interference fringes. If there are a plurality of wavelengths, an intermediate value of the wavelengths is used. In order to form the front alignment film 4, the front glass substrate 2 is inclined with respect to a vapor deposition source at 65°, and film formation is performed by the vapor deposition method. A rear alignment film 8 formed on a rear glass substrate 5 side also consisted of $Al_2O_3$. Both the glass substrates 2 and 5 were stuck to each other, and a liquid crystal 9 was sealed, so that a liquid crystal display device was manufactured.

(Example 5)

An $Al_2O_3$ film having an optical film thickness of $\lambda/4$ and a transparent electrode 3 consisting of ITO having an optical film thickness of $\lambda/2$ are sequentially formed on the rear surface of a front glass substrate 2 by a vapor deposition method. An front alignment film 4 consisting of $Al_2O_3$ having an optical film thickness of $\lambda/4$ is stacked on the transparent electrode 3 to be subjected to an alignment process. In Example 5, in the inclined vapor deposition of the front alignment film 4 in Example 4 described above, an oxygen ion beam was irradiated. A rear alignment film 8 of a rear glass substrate 5 is also formed under the same conditions as those of the front alignment film 4. Both the glass substrates 2 and 5 were stuck to each other, and a liquid crystal 9 was sealed, so that a liquid crystal display device was manufactured.

(Example 6)

An $Al_2O_3$ film having an optical film thickness of $\lambda/4$ and a transparent electrode 3 consisting of ITO having an optical film thickness of $\lambda/2$ are formed on the rear surface of a front glass substrate 2 by a vapor deposition method. An $Al_2O_3$ film having an optical film thickness of $\lambda/4$ is formed as a front alignment film 4 to be subjected to an alignment process. In order to form the front alignment film 4, the front glass substrate 2 is inclined with respect to a vapor deposition source at 65°, and film formation is performed by the vapor deposition method. A rear alignment film 8 formed on a rear glass substrate 5 side also consisted of $Al_2O_3$. Before both the glass substrates 2 and 5 were stuck to each other, both the front glass substrates 2 and 5 were exposed to a vapor of octadecanol serving as a higher alcohol while being heated at 130° C. Thereafter, both the front glass substrates 2 and 5 were stuck to each other, and a liquid crystal 9 was sealed, so that a liquid crystal display device was manufactured.

(Example 7)

An $Al_2O_3$ film having an optical film thickness of $\lambda/4$ and a transparent electrode 3 consisting of ITO having an optical film thickness of $\lambda/2$ are formed on the rear surface of a front glass substrate 2 by a vapor deposition method. An $Al_2O_3$ film having an optical film thickness of $\lambda/4$ is formed as a front alignment film 4 to be subjected to an alignment process. In order to form the front alignment film 4, the front glass substrate 2 is inclined with respect to a vapor deposition source at 65°, and film formation is performed by the vapor deposition method while irradiating an oxygen ion beam. A rear alignment film 8 formed on a rear glass substrate 5 side also consisted of $Al_2O_3$ like the front alignment film 4. Before both the glass substrates 2 and 5 were stuck to each other, both the front glass substrates 2 and 5 were exposed to a vapor of octadecanol serving as a higher alcohol while being heated at 130° C. Thereafter, both the front glass substrates 2 and 5 were stuck to each other, and a liquid crystal 9 was sealed, so that a liquid crystal display device was manufactured.

(Comparative Example 3)

A transparent electrode 3 consisting of ITO is formed on the rear surface of a front glass substrate 2 by a vapor deposition method to have a film thickness of 400 Å. A front alignment film 4 consisting of SiO and a film thickness of 25 Å is stacked on the transparent electrode 3 to be subjected to an alignment process. In vapor deposition of the front alignment film 4, film formation is performed such that the front glass substrate 2 is inclined at 70°. A rear alignment film 8 is formed like the front alignment film 4. Thereafter, both the glass substrates 2 and 5 were stuck to each other, and a liquid crystal 9 was sealed, so that a liquid crystal display device was manufactured.

(Comparative Example 4)

An $Al_2O_3$ film having an optical film thickness of $\lambda/4$ and a transparent electrode 3 consisting of ITO having an optical film thickness of $\lambda/2$ are formed on the rear surface of a front glass substrate 2 by a vapor deposition method. An $SiO_2$ film having an optical film thickness of $\lambda/2$ is formed as a front alignment film 4 while irradiating an oxygen ion beam to be subjected to an alignment process. In this case, $\lambda$ denotes the wavelength of a bright line which causes interference fringes. If there are a plurality of wavelengths, an intermediate value of the wavelengths is used. In order to form the front alignment film 4, the front glass substrate 2 is inclined with respect to a vapor deposition source at 65°, and film formation is performed by the vapor deposition method while irradiating an oxygen ion beam. A rear alignment film 8 formed on a rear glass substrate 5 side also consisted of $SiO_2$. Both the glass substrates 2 and 5 were stuck to each other, and a liquid crystal 9 was sealed, so that a liquid crystal display device was manufactured.

Results obtained by incorporating Examples 4 to 7, Comparative Example 3, and Comparative Example 4 in the liquid crystal projectors to evaluate visibility of interference fringes are shown in Table 2. As the liquid crystal display devices 1, liquid crystal display devices having preferable alignment properties in the examples and cell thickness distributions of about 20% in the examples are selected, and the evaluation is performed. Symbol ○ in Table 2 denotes that interference fringes cannot be easily seen, symbol Δ denotes that interference fringes can be slightly seen, and symbol X denotes that interference fringes can be clearly seen.

TABLE 2

|  | Light Source | Evaluation |
| --- | --- | --- |
| Example 4 | Xenon Lamp | ○ |
| Example 5 | Xenon Lamp | ○ |
| Example 6 | Xenon Lamp | ○ |
| Example 7 | Xenon Lamp | ○ |
| Comparative Example 3 | Xenon Lamp | Δ |
| Comparative Example 4 | Xenon Lamp | ○ |
| Example 4 | Metal Halide Lamp | ○ |
| Example 5 | Metal Halide Lamp | ○ |

TABLE 2-continued

| | Light Source | Evaluation |
|---|---|---|
| Example 6 | Metal Halide Lamp | ○ |
| Example 7 | Metal Halide Lamp | ○ |
| Comparative Example 3 | Metal Halide Lamp | X |
| Comparative Example 4 | Metal Halide Lamp | X |

As is apparent from Table 2 described above, in liquid crystal projector systems using xenon lamps, no interference fringes could not be seen in Example 4 to Example 7 and Comparative Example 4, and interference fringes were slightly observed in Comparative Example 3. However, in liquid crystal projector systems using metal halide lamps, no interference fringes could be seen in Example 4 to Example 7, interference fringes were observed in Comparative Examples 3 and 4. Apparent differences between Examples and Comparative Examples could be obtained.

Figure 9:
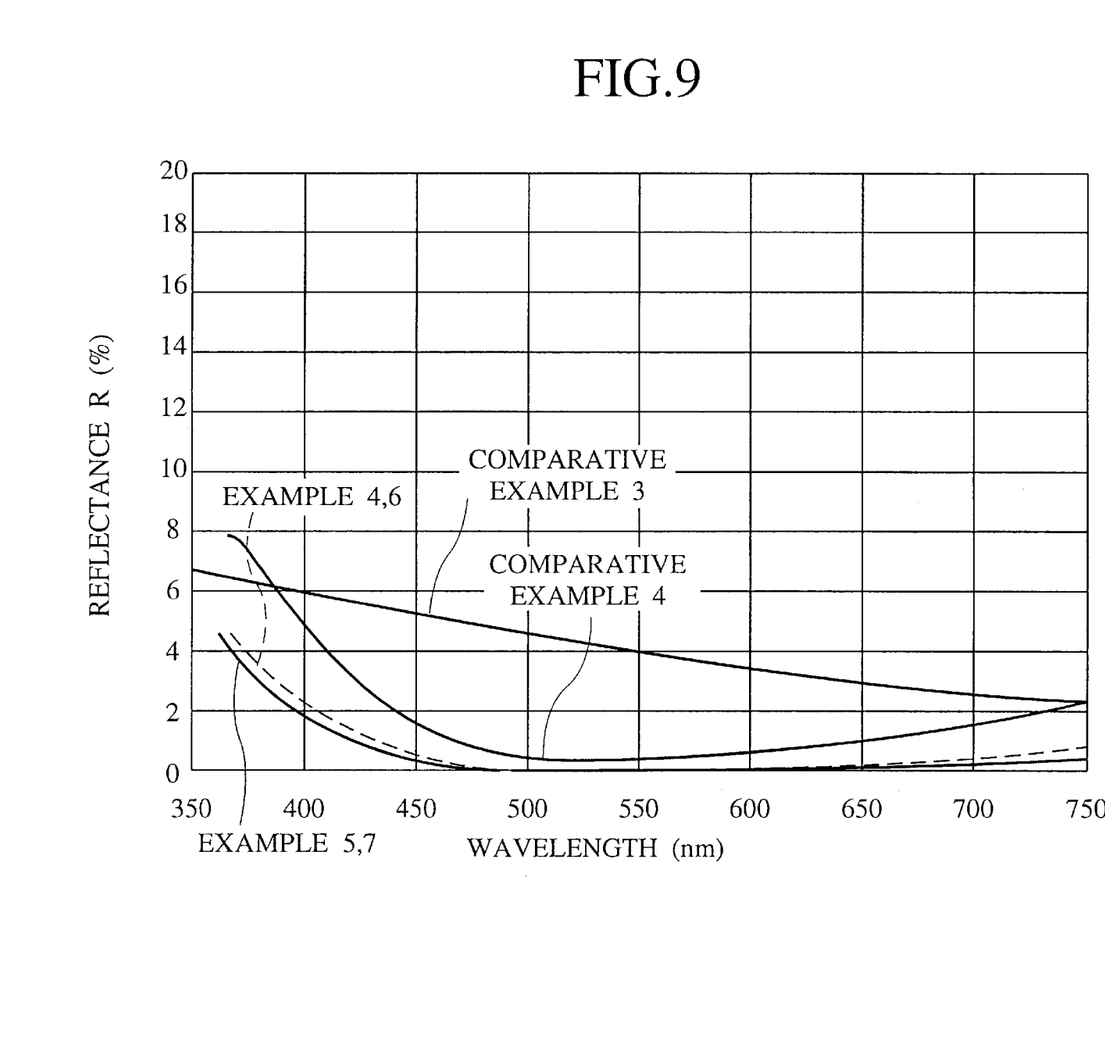
FIG. 9 is a graph showing the relationship between wavelengths obtained when Example 4 to Example 7 of the second embodiment and Comparative Examples 3 and 4 are applied to liquid crystal projector systems and reflectances on the interfaces between alignment films and liquid crystals.

Spectral reflectances on the interfaces between the front alignment films 4 and the liquid crystals 9 in Examples 4 to 7 and Comparative Examples 3 and 4 were measured to obtain the results shown in the graph in FIG. 9. More specifically, in Example 4 to Example 7, reflectances at the wavelengths (440 nm, 540 nm, and 580 nm) of bright lines of the metal halide lamps were 0.5% or less, and interference fringes were rarely observed. On the other hand, in Comparative Example 3, clear interference fringes were generated, and the level of the liquid crystal projector system of Comparative Example 3 could not be practically used. In Comparative Example 4, although a reflectance to a bright line wavelength was 0.7% to 2%, interference fringes were slightly observed.

In addition, when the stability of liquid crystal alignment was checked, the easinesses of generation of alignment disturbance from the periphery in the examples satisfied Example 4≧Example 5≧Example 6>Example 7. The following was found. That is, in Example 7, any alignment disturbance was not generated, and a very good yield could be obtained. As described above, an $Al_2O_3$ film having refractive index between that of the transparent electrode (its refractive index n is about 2) and that of liquid crystal (its refractive index n is 1.49 to 1.55) is used as an alignment film, so that it is possible to get a display device which has a good alignment properties and does not generate any interference fringes.

Although the embodiments have been described above, the present invention is not limited to these embodiments, and various changes following the spirit and scope of the arrangement can be effected. For example, in the embodiments described above, the cases wherein metal halide lamps are used as light sources have been described above. However, the present invention can also be applied to another light source having a bright line in a visible region. In addition, in the above embodiments, a front alignment film is applied as a first transparent material film. In a liquid crystal display mode in which a liquid crystal itself need not have initial alignment, e.g., in a liquid crystal display device using a polymer dispersion type liquid crystal or a ferroelectric liquid crystal, a protective film or the like formed as a first transparent material film on a glass substrate side can be applied.

What is claimed is:

1. A reflection type liquid crystal display device using a light source having a plurality of bright line in a visible region, comprising:

a first and second substrates, at least the first substrate being a transparent;

a first and second electrode layers intervening between the first and second substrates, the first electrode layer on a side of the first substrate being transparent;

a first and second alignment layers intervening between the first and second substrates, the first alignment layers on the side of the first substrate being transparent;

a liquid crystal layer intervening between the first and second alignment layers; and one or more transparent intermediate layers intervening between the first and second substrates having a refractive index smaller than that of the first electrode layer and larger than that of the liquid crystal layer of the first substrate;

wherein a laminate structure constituted by the first electrode layer, the first alignment layer, and the one or more transparent intermediate layers is designated to determine, in all the bright line wavelengths of the light source, the refractive indexes and thicknesses of the layers constituting the laminate structure such that the sum of reflectances, generated on the layer interfaces of the laminate structure, of light propagating from the liquid crystal layer to the first substrate is set to be not more than 0.5%.

2. A reflection type liquid crystal display device according to claim 1, wherein the second electrode layer is a reflective electrode layer which reflects light in a visible region.

3. A reflection type liquid crystal display device according to claim 1, wherein the laminate structure is designed such that a first intermediate layer, the first electrode layer, and the first alignment layer are laminated in order from the first substrate side.

4. A reflection type liquid crystal display device according to claim 1, wherein when the wavelength of the bright line generated by the light source or an intermediate value of wavelengths of the plurality of bright lines generated by the light source is represented by λ, the thickness of the intermediate layer is set to be λ/4 as an optical film thickness and the thickness of the first electrode layer is set to be λ/2 as an optical film thickness.

5. A reflection type liquid crystal display device according to claim 1, further comprising at least two transparent intermediate layers, the first electrode layer intervening between the transparent intermediate layers.

6. A reflection type liquid crystal display device according to claim 1, wherein the one or more transparent intermediate layers comprises $Al_2O_3$.

7. A reflection type liquid crystal projector comprising a liquid crystal device comprising:

a first and second substrates, at least the first substrate being a transparent;

a first and second electrode layers intervening between the first and second substrates, the first electrode layer on a side of the first substrate being transparent;

a first and second alignment layers intervening between the first and second substrates, the first alignment layers on the side of the first substrate being transparent;

a liquid crystal layer intervening between the first and second alignment layers; and one or more transparent intermediate layers intervening between the first and second substrates having a refractive index smaller than that of the first electrode layer and larger than that of the liquid crystal layer or the first substrate;

wherein a laminate structure constituted by the first electrode layer, the first alignment layer, and the one or more transparent intermediate layers is designated to determine, in all the bright line wavelengths of a light source, the refractive indexes and thicknesses of the layers constituting the laminate structure such that the sum of reflectances, generated on the layer interfaces of the laminate structure, of light propagating from the liquid crystal layer to the first substrate is set to be not more than 0.5%.

8. A reflection type liquid crystal projector according to claim 7, wherein a metal halide lamp is used as the light source.

9. A reflection type liquid crystal projector comprising a liquid crystal device according to claim 7, wherein the second electrode layer comprises a reflective electrode layer which reflects light in a visible region.

10. A reflection type liquid crystal projector comprising a liquid crystal device according to claim 7, wherein the laminate structure is designed such that a first intermediate layer, the first electrode layer and the first alignment layer are laminated in order from the first substrate side.

11. A reflection type liquid crystal projector comprising a liquid crystal device according to claim 7, further comprising at least two transparent intermediate layers, the first electrode layer intervening between the transparent intermediate layers.

12. A reflection type liquid crystal projector comprising a liquid crystal device according to claim 7, wherein the one dr more transparent intermediate layers comprises $Al_2O_3$.

* * * * *